United States Patent [19]
Kross

[11] Patent Number: 4,953,688
[45] Date of Patent: Sep. 4, 1990

[54] CONVEYOR WITH ARTICLE ALIGNMENT

[75] Inventor: James R. Kross, Pacific, Mo.

[73] Assignee: Anheuser-Busch Companies, Inc.

[21] Appl. No.: 384,260

[22] Filed: Jul. 21, 1989

[51] Int. Cl.$^5$ ............................................. B65G 47/26
[52] U.S. Cl. .................................. 198/434; 198/463.3; 198/463.5
[58] Field of Search .................. 198/463.3, 463.5, 434, 198/461, 419.1

[56] References Cited

U.S. PATENT DOCUMENTS

| | | | |
|---|---|---|---|
| 3,187,873 | 6/1965 | Wolff | 198/434 |
| 3,429,416 | 2/1969 | Provost et al. | 198/463.3 |
| 3,700,090 | 10/1972 | Pearson | 198/463.3 |
| 3,830,358 | 8/1974 | Desantis | 198/34 |
| 3,944,214 | 3/1976 | Fallos et al. | 271/10 |
| 3,945,505 | 3/1976 | Frisbie et al. | 214/1 BB |
| 3,960,262 | 6/1976 | Henig | 198/127 R |
| 4,240,856 | 12/1980 | Craemer et al. | 156/205 |
| 4,754,867 | 7/1988 | De Anda | 198/464.2 |
| 4,771,877 | 9/1988 | Langen | 198/461 |

FOREIGN PATENT DOCUMENTS

2714543 10/1978 Fed. Rep. of Germany ... 198/463.3

Primary Examiner—Joseph E. Valenza
Attorney, Agent, or Firm—Richards, Medlock & Andrews

[57] ABSTRACT

A plurality of articles are conveyed as an array of successive rows wherein each row contains at least two articles in a general line extending transversely to the direction of travel of the articles. Relative motion between a conveying surface and an alignment element positioned downstream of the conveying surface is effected to cause the articles within a row to encounter the alignment element and thereby become aligned with respect to each other. The relative motion is then reversed to permit the thus aligned row of articles to clear the alignment element while exiting the conveying surface. In the preferred version, the relative motion is achieved by the substantially vertical motion of the downstream end of a pivotable conveyor adjacent to a stationary alignment bar. The movements of the conveyor can be controlled responsive to the arrival of a row of articles at the downstream end of the pivotable conveyor.

23 Claims, 5 Drawing Sheets

CONVEYOR WITH ARTICLE ALIGNMENT

FIELD OF THE INVENTION

The invention relates to method and apparatus for conveying a plurality of articles in successive rows and for aligning the articles within a row. In one aspect, the invention relates to method and apparatus for moving the downstream end of a conveyor relative to an alignment surface to cause the articles within a row to encounter the alignment surface and thereby become aligned with each other and then to cause the thus aligned row to clear the alignment surface and exit the conveyor. In another aspect, the invention relates to method and apparatus for controlling the movement of the downstream end of the conveyor responsive to the presence of articles on the downstream end of the conveyor.

BACKGROUND OF THE INVENTION

In order to achieve economical production rates, toaster pastries can be conveyed through a baking oven and other processing zones as a series of rows of individual generally rectangular pastries wherein the pastries in a row are parallel to each other and in a line which is perpendicular to the direction of travel. Due to vibration of the equipment or other factors some of the pastries in a row can become skewed, i.e., the centerline of the pastry is at an angle to the direction of travel, and/or misaligned, i.e., one or more pastries in a row lead or trail the other pastries in that row. However, some of the processing operations, and particularly the packing operation, can require that the pastries in a row be correctly oriented and aligned.

One mechanism which has been employed to provide the desired alignment of the pastries incorporates a barrier gate which is periodically lowered downwardly onto the conveying surface to catch and align the pastries. However, if the pastries are staggered or skewed excessively, the gate can land on one or more of the pastries rather than landing clearly between two rows. Alignment cannot be achieved if the gate lands on a pastry, and the impact can chip or break the pastry, which produces an unacceptable appearance. Efforts to avoid these problems have generally involved substantially increasing the distance between successive rows, but this can decrease the production rate and/or increase the length of the conveyor. For some devices of this type the minimum effective spacing between adjacent rows is three times the length of the product. The associated acceleration belt can be as much as ten feet in length.

Accordingly, it is an object of the present invention to provide improved method and apparatus for conveying a plurality of articles in successive rows and for aligning the articles within a row. Another object of the invention is to provide an improved method and apparatus for presenting an alignment surface to a plurality of articles moving in directions parallel to each other and generally perpendicular to the alignment surface. Yet another object of the invention is to provide an improved system for controlling the alignment operation. A further object of the invention is to avoid damage to the articles being aligned. Other objects, aspects and advantages of the invention will be apparent from a study of the specification, the drawings and the appended claims to the invention.

SUMMARY OF THE INVENTION

In accordance with the invention an alignment element is positioned downstream of the downstream end of a conveyor, and one is moved generally vertically with respect to the other between a first position wherein articles on the conveyor encounter the alignment element and are thereby aligned in a row, and a second position wherein the aligned articles clear the alignment element and exit the conveyor.

In a presently preferred embodiment of the invention, the downstream end of the conveyor is pivoted about a generally horizontal axis located upstream thereof. The arrival of the first article in a row of articles at the downstream end of the conveyor can be detected. After a predetermined time sufficient to permit any stragglers in the row to encounter the alignment element, the downstream end of the conveyor is raised to permit the aligned row of articles to clear the alignment element and exit the conveyor. After the expiration of a second period of time sufficient for the aligned row of articles to exit the conveyor, the downstream end of the conveyor is lowered so that the next row of articles on the conveyor will encounter the alignment element. If one or more articles remain on the downstream end of the conveyor when it is returned to the first position, the downstream end of the conveyor can be immediately returned to the second position to permit the laggard articles to exit the conveyor. This action can be repeated as many times as is necessary for the downstream end of the conveyor to be free of articles when it reaches the first position.

The pivoting conveyor can be operated at a faster speed than the immediately preceding conveyor such that the distance between successive rows of articles on the pivoting conveyor is greater than the distance between successive rows on the preceding conveyor.

The pivoting conveyor can be provided with two pneumatic pistons, one to counterbalance the weight of the downstream end of the conveyor and the other to effect the desired upward and downward motion of the downstream end of the conveyor.

DETAILED DESCRIPTION

Figures 1, 2:
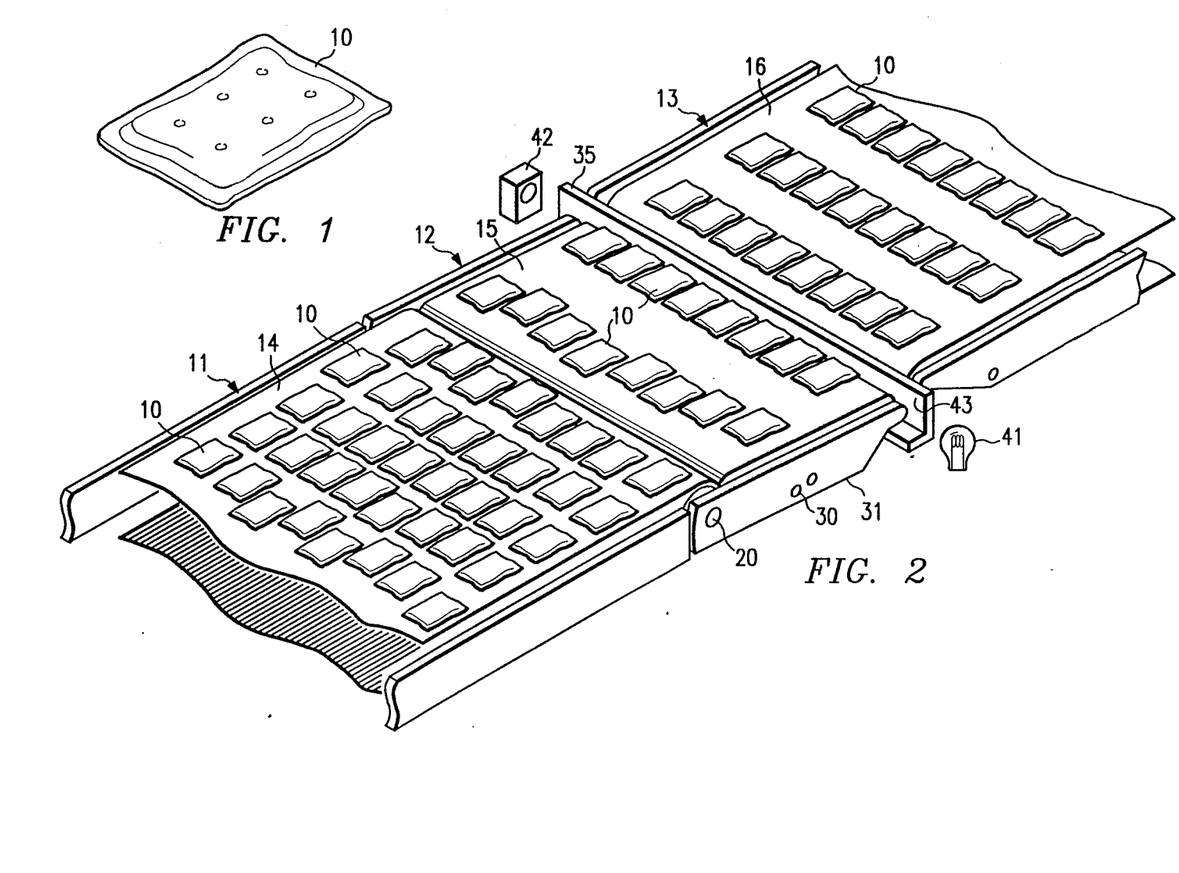
FIG. 1 is a perspective view of a single pastry.
FIG. 2 is a simplified perspective view of a conveyor system having three conveyor sections and incorporating one embodiment of the row alignment concept of the present invention.

Referring now to FIGS. 1 and 2, a plurality of individual toaster pastries (10), which are of a generally rectangular configuration, are being transported from a baking area (not shown) to a packaging area (not shown) by way of a conveying system which comprises a first, upstream conveyor 11, a second, intermediate conveyor 12, and a third, downstream conveyor 13. Each of conveyors 11, 12 and 13 has an upstream end and a downstream end, viewed in the direction of travel of the pastries, and a conveying surface in the form of an endless belt. The pastries are positioned on the planar portion of conveying surface 14 of upstream conveyor 11 in an array of successive rows, with each row containing eight pastries generally in a line which is transverse, and preferably perpendicular, to the direction of travel of the pastries on the conveyors 11, 12 and 13. The long dimension or length of each pastry is at least generally parallel to the direction of travel.

Conveyor 12 is positioned such that a row of pastries exiting the downstream end of conveyor 11 is received on the conveying surface 15 at the upstream end of conveyor 12. Conveyor 13 is positioned such that a row of pastries exiting the downstream end of conveyor 12 is received on the conveying surface 16 at the upstream end of conveyor 13.

Figure 3:
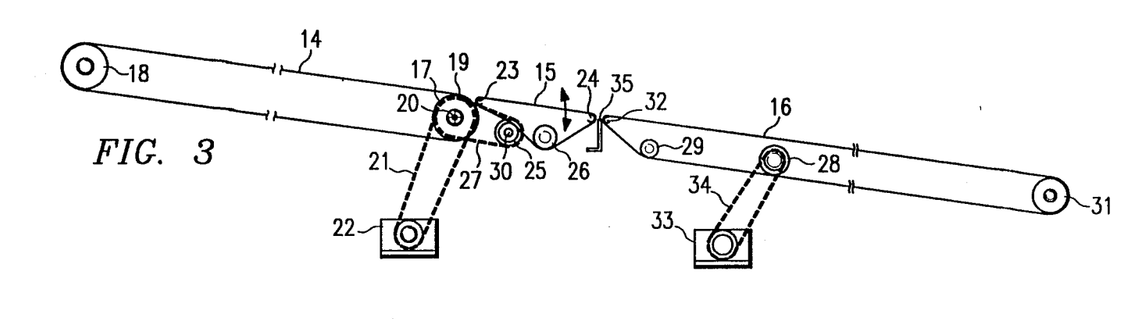
FIG. 3 is a simplified diagram of the driving means for the three conveyor sections of FIG. 2.

Referring now to FIG. 3, conveyor belt 14 is mounted on a drive roll 17 at the downstream end of conveyor 11 and an idler roll 18 at the upstream end of conveyor 11. Drive roll 17 and sprocket 19 are mounted on horizontally positioned shaft 20 and are rotated by chain 21, which in turn is driven by motor 22. Conveyor belt 15 is mounted around fixed upstream nose piece 23, fixed downstream nose piece 24, drive roll 25 and adjustment roll 26. Drive roll 25 is mounted on shaft 30 and rotated by a timing belt 27 which is driven by a timing belt sprocket 44 (FIG. 6) mounted on the opposite end of shaft 20 from sprocket 19. The fixed nose piece 23 provides a curved surface of short radius compared to roll 17, to permit conveyor belt 15 to be positioned very close to conveyor belt 14 so that the gap between the planar portions of conveyor belts 14 and 15 is sufficiently small that the pastries 10 will readily pass from conveyor belt 14 to conveyor belt 15. The size of the timing belt sprocket 44, the sprocket on the end of drive roll 25, sprocket 19 and the drive rolls 17 and 25 are selected such that the conveying surface 15 is driven at a faster speed than the conveying surface 14. This increase in speed results in an increase in the distance between rows of pastries on conveying surface 15 as compared to the rows on conveying surface 14.

Conveyor belt 16 is mounted around drive roll 28, idler rolls 29 and 31 and fixed nose piece 32. Motor 33 and drive chain 34 rotate roll 28 to provide the desired rate of travel of belt 16.

An alignment element 35 is mounted immediately downstream of the downstream end of conveying surface 15, while the upstream end of conveying surface 16 is mounted immediately downstream of the alignment element 35. Thus, the alignment element 35 extends substantially vertically between the downstream end of conveyor 12 and the upstream end of conveyor 13. It is preferable that the upper edge of alignment element 35 be positioned below the transporting plane of conveying surface 16 such that when the downstream end of conveyor 12 is raised to its upper or discharge position the pastries exiting conveyor 12 will readily clear alignment element 35 and be received on the conveying surface 16. The frame 31 for conveyor 12, in which nose pieces 23 and 24 and rolls 25 and 26 are mounted, is constructed and mounted to pivot about the horizontal axis of shaft 20. Thus, while the downstream end of conveyor 12 can be moved substantially vertically with respect to alignment element 35, the distance between shaft 20 and drive roll 25 remains essentially constant, permitting the maintenance of an essentially constant relationship between the speed of conveyor 12 and the speed of conveyor 11.

Figure 4A:
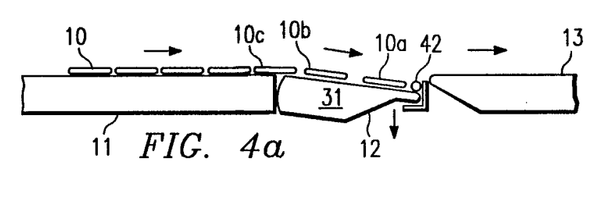
FIGS. 4a–4d are simplified side elevational views of the conveyor system of FIG. 2 showing the relationship of the alignment element and the position of the pivoting conveyor section as a row of articles approaches the alignment element, is aligned, is raised to clear the alignment element, and is conveyed away by the downstream conveyor section.
Figure 4B:
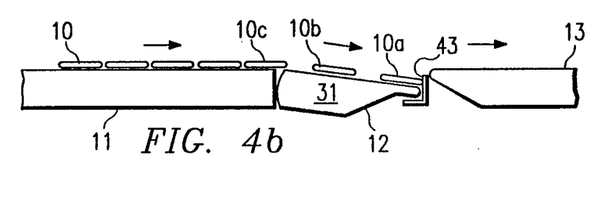

Referring now to FIGS. 4a-4d, the home position for pivoting conveyor 12 is the down position shown in FIG. 4a. The home position will be maintained so long as the conveyor system is operating in the normal mode and there are no pastries on conveyor 12. The first three successive rows 10a, 10b, and 10c of a new production run are illustrated with row 10a just approaching the downstream end of conveyor 12 and not yet having moved into the light path between light source 41 (FIG. 2) and photocell 42. In FIG. 4b, the leading pastry in row 10a has interrupted the light beam, actuating the control system. The remaining pastries in row 10a as well as the leader have encountered the straight, substantially vertical alignment surface 43 and have become both oriented with regard to the direction of travel and aligned with respect to each other. This can readily be seen in FIG. 2 by comparing the row of pastries contacting alignment surface 43 with the immediately following (upstream) row, which contains pastries still in a staggered position.

Figure 4C:
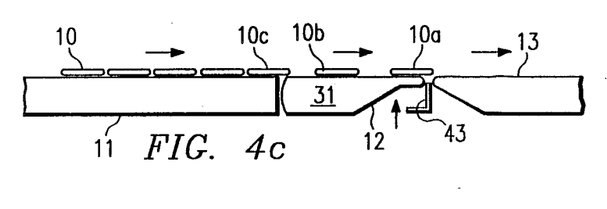

After the expiration of a predetermined time period which began with the interruption of the light beam by the leading pastry in row 10a, the conveyor 12 can be pivoted about shaft 20 to raise the downstream end of conveyor 12 to its upper or discharge position. One purpose of this predetermined time period is to permit the lagging pastries to catch up and align themselves with all other pastries in the row. In the discharge position, the downstream end of the planar portion of conveying surface 15 of conveyor 12 is above the upper edge of alignment element 35 and preferably slightly above the planar portion of conveying surface 16 of conveyor 13. This enables the pastries in now aligned row 10a to clear the alignment element 35 and be readily received by the conveying surface 16 upon the pastries exiting conveyor 12.

Figure 4D:
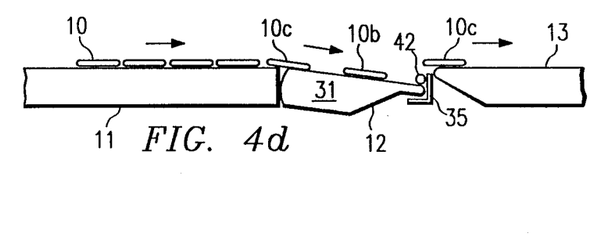

After the expiration of a second predetermined period of time, which began with the expiration of the first predetermined period of time and is sufficiently long for the aligned row of pastries to have at least substantially exited conveyor 12, the conveyor 12 is pivoted downwardly from its discharge position to its home or receiving position, as shown in FIG. 4d. In other words, the exiting row should be at least balanced on the upstream edge of conveyor 13 at the time conveyor 12 is pivoted downwardly. At the time the pivoting conveyor reaches the home position, the next row 10b has not yet had time to reach the light beam. Light source 41 and detector 42 can be mounted on the frame of conveyor 12 so that they move with the conveyor 12 as it pivots. For a normal transfer of the aligned row of pastries from conveyor 12 to conveyor 13, the light beam to photocell 42 is reestablished during the downward movement of the pivoting conveyor 12. This design requires no separation between successive rows of pastries because the downward pivot can be timed to permit the next row of pastries to be aligned to move underneath the exiting aligned row.

Figure 5:
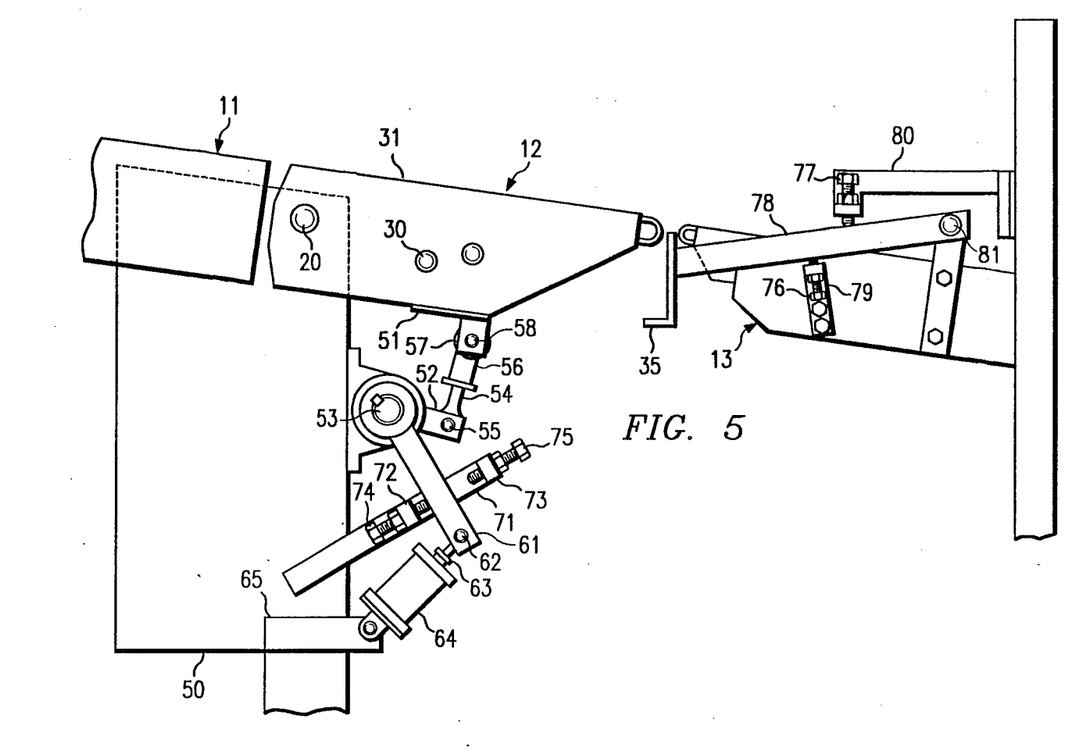
FIG. 5 is a simplified side elevational view of a mechanism for pivoting the pivotable conveyor section and a means for positioning the alignment element.
Figure 6:
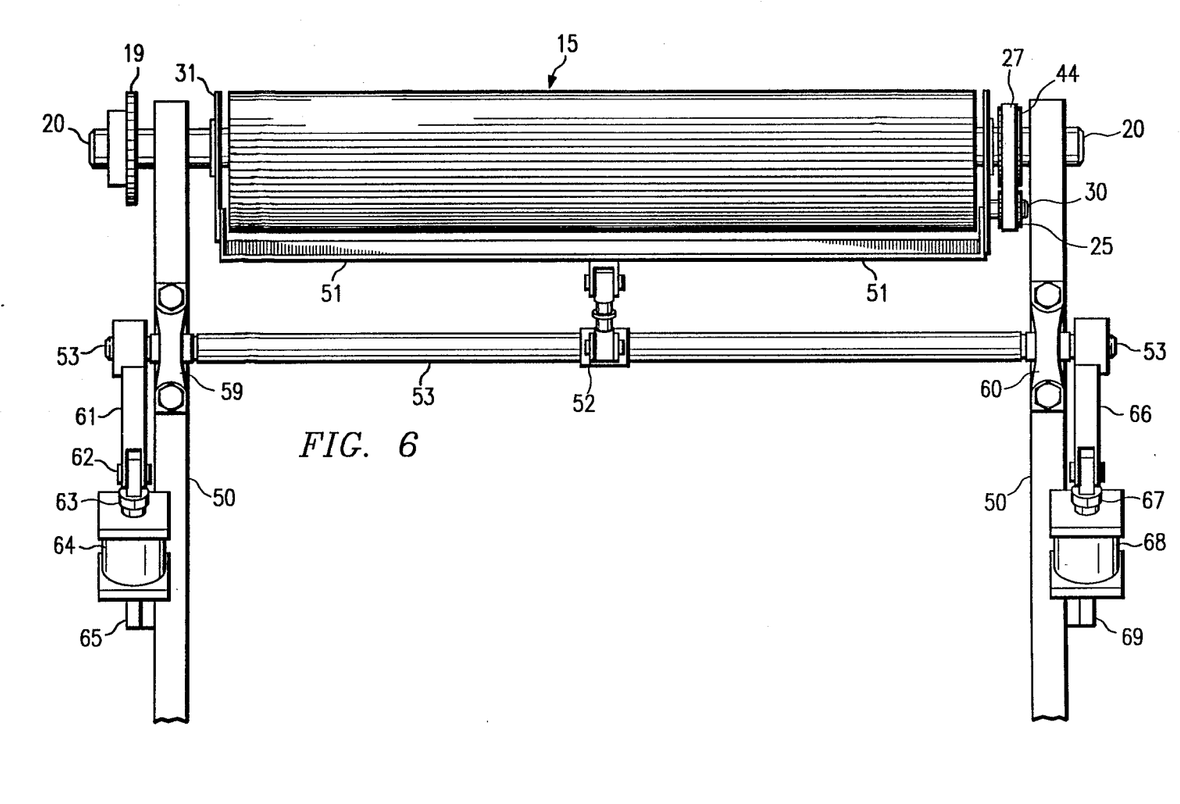
FIG. 6 is a simplified end view of the pivotable conveyor section looking upstream.

Referring now to FIGS. 5 and 6, each end of horizontal shaft 20 is rotatably mounted in side frame plates 50. Frame 31 of conveyor 12 is mounted on shaft 20 for pivotable movement about the horizontal axis of shaft 20. A conveyor lifting plate 51, having an L cross-sectional configuration, is secured to the bottom edge of the two sides of frame 31. An actuation lever 52 has a U-shaped yoke at one end and a cylindrical sleeve at its other end, with the sleeve being secured about horizontal shaft 53 for rotation therewith.

A male rod end bearing 54 is pivotably mounted in the yoke end of lever 52 by pin 55 with bearing 54 being freely rotatably about pin 55. The corresponding female rod end bearing 56 is pivotably attached to bracket 57 by pin 58, with bearing 56 being freely rotatable about pin 58. Bearings 54 and 56 are threadedly engaged to each other to provide adjustability. Bracket 57 is secured to the underside of conveyor lifting plate 51 approximately midway between its ends. Shaft 53 is rotatably positioned in pillow block bearings 59 and 60. One end of actuation lever 61 has a sleeve which is mounted about and keyed to shaft 53 for rotation therewith. The other end of actuation lever 61 is in the form of a yolk. A pin 62 extends freely through the external end of the piston 63 of pneumatic cylinder 64 to pivotably connect lever 61 to pneumatic piston 63. The opposite end of the pneumatic cylinder casing is pivotally secured to bracket 65 which is in turn secured to frame side plate 50. One end of lever 66 has a sleeve which is positioned about and keyed to the other end of shaft 53. The other end of lever 66 is in the form of a yolk and pin for pivotable connection to the external end of pneumatic piston 67 of pneumatic cylinder 68. The casing of cylinder 68 is pivotably connected to bracket 69 which is mounted on frame side plate 50.

Air is supplied to cylinder 68 at a predetermined pressure which is sufficient for piston 67 to counterbalance all or at least a substantial portion of the weight of the downstream end of conveyor 12. Pressurized air is supplied to the two chambers of cylinder 64 by the control system to effect the raising and lowering of the downstream end of conveyor 12 at the desired times. The presence of the counterbalancing force provided by cylinder 68 permits an efficient actuation by cylinder 64 that needs to only offset the inertia of the pivoting conveyor.

A bracket 71 having horizontal arms 72 and 73 is secured to the frame. Adjustment screws 74 and 75 are threadably engaged in arms 72 and 73, respectively, in the travel path of lever 61 to serve as travel limits for the pivoting of lever 61 about shaft 53. Thus, the extension of piston 63 causes lever 61 to rotate shaft 53 counterclockwise (as viewed in FIG. 5), thereby raising the outer end of lever 52 and the downstream end of conveyor 12. The retraction of piston 63 causes lever 61 to rotate shaft 53 clockwise, lowering the outer end of lever 52 and the downstream end of conveyor 12.

While the alignment element 35 is stationary in the illustrated embodiment, its position can be adjusted by the position of set screws 76 and 77 acting against support bar 78. One end of bar 78 is pivotably mounted on the frame of conveyor 13 by pin 81 while the other end of bar 78 supports alignment element 35. Set screws 76 and 77 can be positioned in brackets 79 and 80 which are mounted on the framework of conveyor 13.

Figure 7:
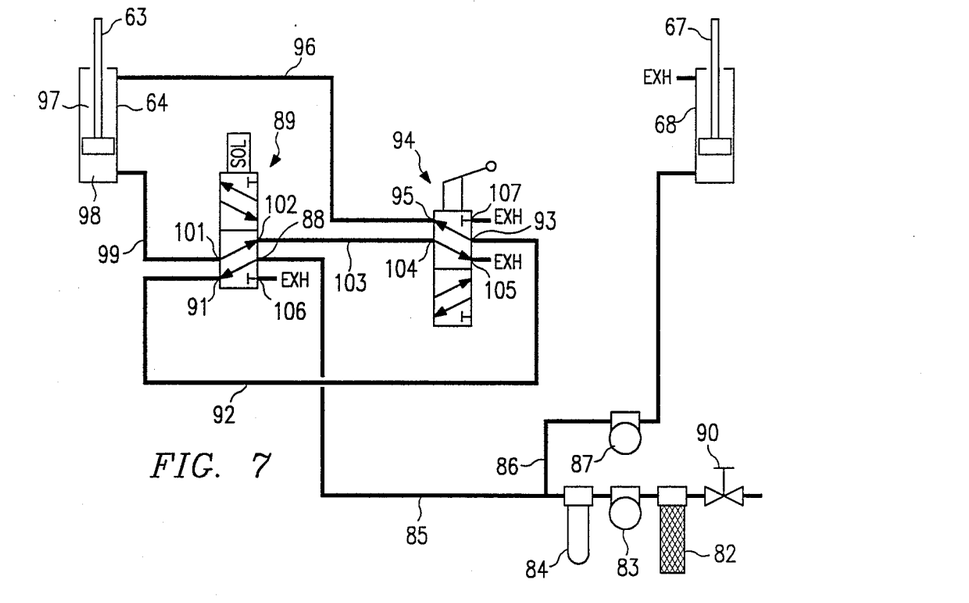
FIG. 7 is a schematic diagram of a pneumatic system for operating the pivotable conveyor system.

Referring now to FIG. 7, air under pressure is passed through valve 90, filter 82, pressure regulator 83 and lubricator 84 to branch conduits 85 and 86. Conduit 86 provides air at a predetermined pressure, determined by a pressure regulator 87, to the piston chamber of air cylinder 68 to extend piston 67 sufficiently to counterbalance the steady state downward force exerted by the downstream end of conveyor 12. Conduit 85 provides pressurized air to a first inlet port 88 of two position solenoid actuated pneumatic valve 89. In the first position (illustrated) of valve 89, inlet port 88 is connected through outlet port 91 and conduit 92 to a first inlet port 93 of two position, manually actuated pneumatic valve 94. In the "normal" (illustrated) position of manual valve 94, port 93 is connected through port 95 and conduit 96 to the piston chamber 97 of air cylinder 64 to cause piston 63 to be retracted, lowering the pivotable conveyor 12 to its down position. The opposing piston chamber 98 is connected through conduit 99, ports 101 and 102 of valve 89, conduit 103, and port 104 of valve 94 to exhaust port 105. In the second position of valve 89, inlet port 88 is connected to port 101, while port 91 is connected to exhaust port 106, thereby causing the piston 63 to move to its extended position, raising the pivotable conveyor 12 to its discharge position.

Manual valve 94 permits an operator to bypass the automatic control of pivotable conveyor 12 by manually moving valve 94 to its second position, in which port 95 is connected to exhaust port 107, thereby venting chamber 97 and pressurizing chamber 98 to cause the piston 63 to be extended, thus raising pivotable conveyor 12 to and maintaining it at its discharge position regardless of the position of valve 89.

Figure 8:
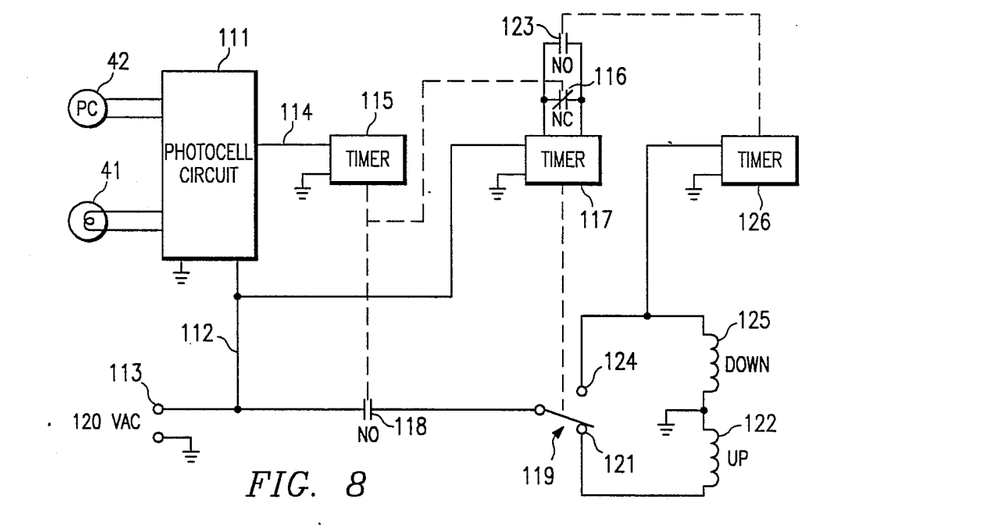
FIG. 8 is a schematic diagram of an electrical circuit for actuating the pneumatic system of FIG. 7.

Referring now to FIG. 8, light source 41 and photocell 42 are connected to photocell circuit 111, which in turn, is connected by lead 112 to a suitable source 113 of 120 V AC. Photocell circuit 111 produces a first control signal when the light beam is interrupted by the leading pastry in a row, and this first signal is applied via lead 114 to timer 115. Timer 115 is adjusted to produce a second control signal at the end of a first predetermined time period which began with the interruption of the light beam by the foremost pastry. The second control signal opens normally closed switch 116 which is in the reset circuit of timer 117, and closes normally open switch 118 which connects the common terminal of two-way switch 119 to power source 113. The contactor of switch 119 is normally on terminal 121; thus, the closing of switch 118 applies a voltage across "up" solenoid coil 122 to move valve 89 to its second position, thereby extending piston 63 and raising conveyor 12.

Normally open switch 123 is connected in parallel with normally closed switch 116. When both switches 116 and 123 are open, timer 117 begins counting a second predetermined time period. The length of this second time period is selected to correspond to the time required for the aligned row of pastries to at least substantially exit conveyor 12 and be adequately supported by conveyor 13. At the end of the second time period, timer 117 moves the contactor of switch 119 from terminal 121 to terminal 124, thereby applying a voltage across "down" solenoid coil 125. The actuation of solenoid coil 125 moves valve 89 to its first position, causing piston 63 to retract and lower conveyor 12 to its alignment position.

The movement of the switch contactor to terminal 124 also applies a voltage to the input of timer 126 to initiate the counting of a third predetermined time period. At the end of this third time period, which is slightly longer than the time it takes conveyor 12 to move downwardly from its discharge position sufficiently for the light beam to pass beneath the exiting row of pastries, timer closes normally open switch 123 unless in the meantime timer 126 is deactivated. The light beam to photocell 42 has been interrupted since the arrival of the leading pastry. When conveyor 12 is about midway in its downward motion, the path of the light beam should be clear, and the reception of the light beam by photocell 42 causes timer 115 to be reset, thereby opening switch 118 and closing switch 116, thereby resetting timer 117 and moving the switch contactor from terminal 124 to terminal 121. There is no actuation of solenoid coil 122 as switch 118 is now open. These events occur just prior to the point in time at which timer 126 would otherwise close switch 123 at the end of the third time period. The opening of switch 118 removes the power from timer 126, causing it to reset.

However, if one or more of the pastries from the aligned row fall back onto conveyor 12 rather than fully exiting conveyor 12, the light beam will continue to be interrupted when the conveyor 12 has returned to its lower position. If this occurs, timer 115 is not reset, switch 118 continues to be closed and switch 116 continues to be open. Then, when timer 126 closes switch 123, timer 117 is reset, moving switch contactor from terminal 124 to terminal 121. As switch 118 continues to be closed, solenoid coil 122 is actuated and conveyor 12 is moved to its discharge position without having to wait for the expiration of the first time period. At the end of the second time period, timer 117 moves switch contactor from terminal 121 to terminal 124, actuating timer 126 and causing the conveyor 12 to move downwardly. If upon conveyor 12 reaching the down position, the photocell 42 sees the light beam, timer 115 is reset, closing switch 116 and opening switch 118, deactivating timer 126. However, if the light beam is still interrupted, timer 126 will close switch 123 to reset timer 117, actuate solenoid coil 122 and raise conveyor 12 for another dejamming cycle. This dejamming operation will continue until the photocell again sees the light beam. An alarm, not shown, can be actuated by timer 126 to alert the operator to the occurrence of a dejamming operation.

In one installation of the invention, conveyor belt 15 was a stainless steel mesh belt, which provided excellent frictional contact between the belt and the pastries. The pastries were arrayed with eleven pastries to a row, each pastry being about 3 inches by about 4 inches with the long dimension being parallel to the direction of travel of the pastries on the belt. The inertia of the pastries forced the leading edge of each pastry in the row to be aligned against the stationary alignment bar, which is the dynamics for the alignment operation. Conveyor 12 was only 19 inches long (in contrast to the ten foot length of some prior alignment conveyors), and the discharge end traveled approximately one inch between its alignment position and its discharge position. In the discharge position, the downstream end of the pivoting conveyor belt was approximately 3/16 inch higher than the top of the alignment bar. The light source 41 was an infrared light source and was positioned so that the light beam was approximately ¼ inch upstream of the stationary alignment bar when conveyor 12 was in the lower position. While this apparatus can operate to align pastries in rows where successive rows actually contact each other on the pivoting conveyor, it is generally preferable that a finite separation between rows be present to insure the precision of the alignment.

While the invention has been illustrated for the purpose of conveying and aligning toaster pastries, it is applicable to other articles as well. While each row has been illustrated as containing eight articles, the system works with two or more articles in each row. While the invention has been illustrated in terms of a stationary alignment element and a pivoting conveyor, the relative motion can be achieved by reciprocating the alignment element and leaving the conveyor in a stationary position. However, the presently preferred embodiment incorporating the pivoting conveyor has several advantages over the reciprocating alignment element. When the aligned row of pastries is received by the third conveyor 13 sufficiently to be supported by the third conveyor 13 at the time the pivoting conveyor 12 moves downwardly, the rear third of each pastry in the aligned row can still be extending backwardly over, but not contacting, the alignment element 35. Thus, it is possible for the leading edges of the next row of pastries to pass under the trailing edges of the preceding row and contact the alignment element 35 without interfering with the preceding row even if it is still above the alignment element 35. If the relative motion were to be accomplished by moving the alignment element 35 upwardly before the preceding row has been completely received on conveyor 13, the alignment element 35 could raise the rear edges of the pastries so that they would be supported on conveyor 13 only along their front edges. Due to variations in the texture of the bottom surfaces of the pastries, this could cause some of the pastries to become misaligned. Accordingly, it is preferred for the relative movement to be accomplished by pivoting the conveyor 12 while maintaining alignment element 35 in a stationary location just below the transporting plane of conveyor 13.

The arrival of the leading article can be sensed by any suitable means other than the photocell and light beam. The pneumatic and electrical control system can be replaced by any other control system suitable for accomplishing the desired control of the relative motion between the conveyor and the alignment element. Valve 89 can be replaced with a valve which is solenoid actuated in one direction and spring biased for the other direction. Other reasonable variations and modifications to the inventions are possible within the scope of the foregoing disclosure and the appended claims to the invention.

I claim:

1. Apparatus comprising:
  an alignment conveyor having an upstream end and a downstream end and having a first conveying surface suitable for conveying in a first direction of travel toward said downstream end a plurality of discrete articles which would be at least generally arrayed on said first conveying surface in a plurality of successive rows, each of said rows extending transversely to said first direction of travel and containing at least two of said articles, first drive means for moving said first conveying surface in said first direction of travel at a first rate of movement,
  an alignment element positioned downstream of and adjacent to said downstream end of said alignment conveyor and having an article contact surface extending transversely to said first direction of travel in at least a generally horizontal direction which is at least generally parallel to said downstream end of said alignment conveyor, means for effecting relative movement between said downstream end of said alignment conveyor and said alignment element generally vertically between a first position wherein a row of article on said first conveying surface can encounter said contact surface of said alignment element to cause the articles in the encountering row to become aligned according to said contact surface, and a second position wherein a row of articles exiting said alignment conveyor clears said alignment element, wherein said means for effecting movement comprises pivot means for pivotably mounting said upstream end of said alignment conveyor for pivotal rotation about an axis which is at least generally parallel to said first conveying surface and at least generally perpendicular to said first direction of travel, and means for moving said downstream end of said alignment conveyor between said first and second positions by causing said alignment conveyor to pivot about said axis, further comprising an upstream conveyor having an upstream end and a downstream end, said upstream conveyor having a second conveying surface and being positioned such that a row of articles exiting the downstream end of said upstream conveyor is received by said first conveying surface at the upstream end of said alignment conveyor and is conveyed by said first conveying surface to the downstream end of the alignment conveyor, second drive means for moving said second conveying surface at least generally in said first direction of travel at a second rate of movement which is less than said first rate of movement to thereby increase the distance between successive rows of articles on said first conveying surface as compared to the distance between successive rows of articles on said second conveying surface, wherein said second drive means comprises a horizontally positioned drive roll for said upstream conveyor, wherein the axis about which said alignment conveyor is pivotable is the longitudinal axis of said drive roll, and wherein said first drive means comprises a drive roll for said alignment conveyor and means for rotating said drive roll for said alignment conveyor responsive to the rotation of said drive roll for said upstream conveyor.

2. Apparatus in accordance with claim 1 further comprising a downstream conveyor having an upstream end and a downstream end and a third conveying surface, said downstream conveyor being positioned such that a row of articles exiting the downstream end of said alignment conveyor and clearing said alignment element is received by said third conveying surface at the upstream end of said downstream conveyor and is conveyed by said third conveying surface toward the downstream end of said downstream conveyor, third drive means for moving said third conveying surface at least generally in said first direction of travel at a third rate of movement.

3. Apparatus in accordance with claim 1 wherein said means for moving said downstream end of said alignment conveyor comprises a first fluid actuated piston, which has an extended position and a retracted position, means for actuating said downstream end of said alignment conveyor to one of said first and second positions responsive to said piston moving to its extended position and to the other of said first and second positions responsive to said piston moving to its retracted position.

4. Apparatus in accordance with claim 3 further comprising a second fluid actuated piston operatively connected to the downstream end of said alignment conveyor, and means for supplying fluid to said second fluid actuated piston so as to counterbalance at least a substantial portion of the weight of the downstream end of said alignment conveyor.

5. Apparatus in accordance with claim 4 further comprising means for sensing the arrival of an article at a point adjacent said downstream end of said alignment conveyor, means for actuating said first fluid actuated piston to move said downstream end of said alignment conveyor from said first position to said second position at a predetermined time after said arrival of an article is sensed and means for actuating said first fluid actuated piston to move said downstream end of said alignment conveyor from said second position to said first position at a predetermined time after said downstream end of said alignment conveyor is moved from said first position to said second position.

6. Apparatus in accordance with claim 5 further comprising means for actuating said first fluid actuated piston to return said downstream end of said alignment conveyor to said second position if said means for sensing senses an article upon said downstream end of said alignment conveyor being moved to said first position.

7. Apparatus comprising:

an alignment conveyor having an upstream end and a downstream end and having a first conveying surface suitable for conveying in a first direction of travel toward said downstream end a plurality of discrete articles which would be at least generally arrayed on said first conveying surface in a plurality of successive rows, each of said rows extending transversely to said first direction of travel and containing at least two of said articles, first drive means for moving said first conveying surface in said first direction of travel at a first rate of movement, an alignment element positioned downstream of and adjacent to said downstream end of said alignment conveyor and having an article contact surface extending transversely to said first direction of travel in at least a generally horizontal direction which is at least generally parallel to said downstream end of said alignment conveyor, means for effecting relative movement between said downstream end of said alignment conveyor and said alignment element generally vertically between a first position wherein a row of articles on said first conveying surface can encounter said contact surface of said alignment element to cause the articles in the encountering row to become aligned according to said contact surface, and a second position wherein a row of articles exiting said alignment conveyor clears said alignment element, wherein said means for effecting movement comprises pivot means for pivotably mounting said upstream end of said alignment conveyor for pivotal rotation about an axis which is at least generally parallel to said first conveying surface and at least generally perpendicular to said first direction of travel, and means for moving said downstream end of said alignment conveyor between said first and second positions by causing said alignment conveyor to pivot about said axis, wherein said means for moving said downstream end of said alignment conveyor comprises a first fluid actuated piston, which has an extended position and a retracted position, means for actuating said downstream end of said alignment conveyor to one of said first and second positions responsive to said piston moving to its extended position and to the other of said first and second positions responsive to said piston moving to its retracted position, further comprising a second fluid actuated piston operatively connected to the downstream end of said alignment conveyor, and means for supplying fluid to said second fluid actuated piston so as to counterbalance at least a substantial portion of the weight of the downstream end of said alignment conveyor.

8. Apparatus in accordance with claim 1 further comprising means for sensing the arrival of an article at a point adjacent said downstream end of said alignment conveyor, means for actuating said means for moving to move said downstream end of said alignment conveyor from said first position to said second position at a predetermined time after said arrival is sensed, and means for actuating said means for moving to move said downstream end of said alignment conveyor from said second portion to said first position at a predetermined time after said downstream end of said alignment conveyor is moved from said first position to said second position.

9. Apparatus in accordance with claim 8 further comprising means for actuating said means for moving to return said downstream end of said alignment conveyor to said second position if said means for sensing senses an article upon said downstream end of said alignment conveyor being moved to said first position.

10. A method of conveying a plurality of articles and for aligning such articles, which comprises:

depositing a plurality of articles on a conveying surface in an array of successive rows with each row containing at least two of said articles and extending in a line transverse to the direction of travel of said conveying surface, moving said conveying surface having said articles thereon in said direction of travel to cause each successive row of articles to encounter, one row at a time, a stationary alignment surface which extends transversely to said direction of travel and thereby align the articles in the thus encountering row with respect to each other in conformance to the alignment surface, effecting relative motion between said stationary alignment surface and at least the portion of said conveying surface having the thus aligned row of articles thereon by raising said portion of said conveying surface having the thus aligned row of articles thereon at least generally vertically from a first position wherein articles encounter said stationary alignment surface to a second position wherein the thus aligned row of articles clear said stationary alignment surface, while continuing to move said conveying surface having said articles thereon at least generally in said direction of travel to cause the thus aligned row of articles to exit said conveying surface, said second position being higher than said first position.

11. A method in accordance with claim 10 wherein the step of effecting relative motion is accomplished by pivoting said conveying surface about a horizontal axis located upstream of said alignment surface, to raise said conveying surface relative to said alignment surface.

12. A method in accordance with claim 11 further comprising sensing an article as it approaches said alignment surface, and pivoting said conveyor surface from said first position to said second position at a predetermined time after the sensing of the approaching article.

13. A method in accordance with claim 12 wherein said approaching article is the foremost article in a row.

14. A method in accordance with claim 13 further comprising pivoting said conveying surface from said second position to said first position at a predetermined time after said conveying surface is pivoted from said first position to said second position.

15. A method in accordance with claim 14 further comprising determining whether there is an article on said conveying surface closely adjacent to said alignment surface when said conveying surface is pivoted from said second position to said first position, promptly returning said conveying surface to said second position if there is an article on said conveying surface closely adjacent to said alignment surface when said conveying surface is pivoted from said second position to said first position, and leaving said conveying surface in said first position to permit the next row of articles to encounter the alignment surface if there is not an article on said conveying surface closely adjacent to said alignment surface when said conveying surface is pivoted from said second position to said first position.

16. A method in accordance with claim 15 wherein each of said articles has a generally rectangular shape in contact with said conveying surface.

17. A method in accordance with claim 16 wherein said articles are toaster pastries.

18. Apparatus in accordance with claim 4 further comprising a downstream conveyor having an upstream end and a downstream end and a third conveying surface, said downstream conveyor being positioned such that a row of articles exiting the downstream end of said alignment conveyor and clearing said alignment element is received by said third conveying surface at the upstream end of said downstream conveyor and is conveyed by said third conveying surface toward the downstream and of said downstream conveyor, and third drive means for moving said third conveying surface at least generally in said first direction of travel at a third rate of movement.

19. Apparatus in accordance with claim 6 further comprising a downstream conveyor having an upstream end and a downstream end and a third conveying surface, said downstream conveyor being positioned such that a row of articles exiting the downstream end of said alignment conveyor and clearing said alignment element is received by said third conveying surface at the upstream end of said downstream conveyor and is conveyed by said third conveying surface toward the downstream end of said downstream conveyor, and third drive means for moving said third conveying surface at least generally in said first direction of travel at a third rate of movement.

20. Apparatus in accordance with claim 7 further comprising means for sensing the arrival of an article at a point adjacent said downstream end of said alignment conveyor, means for actuating said means for moving to move said downstream end of said alignment conveyor from said first position to said second position at a predetermined time after said arrival is sensed, and means for actuating said means for moving to move said downstream end of said alignment conveyor from said second portion to said first position at a predetermined time after said downstream end of said alignment conveyor is moved from said first position to said second position.

21. Apparatus in accordance with claim 20 further comprising means for actuating said means for moving to return said downstream end of said alignment conveyor to said second position if said means for sensing senses an article upon said downstream end of said alignment conveyor being moved to said first position.

22. A method in accordance with claim 10 further comprising:
sensing at a point adjacent said alignment surface the arrival of the leading article in the row which is about to encounter said alignment surface,
establishing a first time period responsive to the thus sensed arrival of the leading article in a row,
the step of raising said portion of said conveying surface having the thus aligned row of articles thereon form said first position to said second position being initiated at the end of the first time period,
establishing a second time period which is representative of the time required for the aligned row of articles to at least substantially exit said conveying surface, and
effecting, at the end of the second time period, relative motion between said stationary alignment surface and said conveying surface by lowering said conveying surface at least generally vertically from said second position to said first position, while continuing to move said conveying surface.

23. A method in accordance with claim 22 further comprising:
determining whether there is an article on said conveying surface closely adjacent to said stationary alignment surface when said conveying surface is lowered to said first position,
promptly returning said conveying surface to said second position if there is an article on said conveying surface closely adjacent to said stationary alignment surface when said conveying surface is lowered from said second position to said first position, and
leaving said conveying surface in said first position to permit the next row of articles to encounter the stationary alignment surface if there is not an article on said conveying surface closely adjacent to said stationary alignment surface when said conveying surface is lowered from said second position to said first position.

* * * * *

UNITED STATES PATENT AND TRADEMARK OFFICE
CERTIFICATE OF CORRECTION

PATENT NO. : 4,953,688
DATED : September 4, 1990
INVENTOR(S) : James R. Kross

It is certified that error appears in the above-identified patent and that said Letters Patent is hereby corrected as shown below:

Column 3, line 3, change "(10)" to --10--.
Column 9, line 9, change "article" to --articles--.
Column 13, line 25, change "form" to --from--.

Signed and Sealed this

Tenth Day of November, 1992

Attest:

DOUGLAS B. COMER

*Attesting Officer*      *Acting Commissioner of Patents and Trademarks*